United States Patent
Beck et al.

(10) Patent No.: US 7,019,866 B1
(45) Date of Patent: Mar. 28, 2006

(54) COMMON COMMUNICATION BUS AND PROTOCOL FOR MULTIPLE INJET PRINTHEADS IN A PRINTING SYSTEM

(75) Inventors: Jeffery S Beck, Corvallis, OR (US); Michael J Barbour, Corvallis, OR (US); Richard I Klaus, Ridgefield, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/386,034

(22) Filed: Aug. 30, 1999

(51) Int. Cl.
*G06F 15/00* (2006.01)

(52) U.S. Cl. .................. 358/1.8; 358/1.9; 358/1.15; 347/5; 347/237

(58) Field of Classification Search .......... 358/1.8–1.9; 347/237, 240, 12, 5, 58–59
See application file for complete search history.

(56) References Cited

U.S. PATENT DOCUMENTS

| | | | |
|---|---|---|---|
| 3,997,896 A | 12/1976 | Cassarino, Jr. et al. | 340/172.5 |
| 4,203,096 A | 5/1980 | Farley et al. | 340/538 |
| 4,298,978 A | 11/1981 | Nakamura | 370/92 |
| 4,301,532 A | 11/1981 | Janetzky | 370/85 |
| 4,402,073 A | 8/1983 | Hammond | 370/9 |
| 4,689,740 A | 8/1987 | Moelands et al. | 364/200 |
| 4,984,190 A | 1/1991 | Katori et al. | 365/900 |
| 5,049,898 A | 9/1991 | Arthur et al. | 346/1.1 |
| 5,068,806 A | 11/1991 | Gatten | 395/113 |
| 5,363,134 A | 11/1994 | Barbehenn et al. | 347/49 |
| 5,365,312 A | 11/1994 | Hillmann et al. | 355/206 |
| 5,541,629 A | 7/1996 | Saunders et al. | |
| 6,290,334 B1 * | 9/2001 | Ishinaga et al. | 347/59 |

FOREIGN PATENT DOCUMENTS

| | | |
|---|---|---|
| EP | 0930164 | 7/1999 |
| JP | 52-142902 | 11/1977 |
| JP | 55-118138 | 9/1980 |
| JP | 10138479 | 5/1998 |

* cited by examiner

Primary Examiner—Twyler M. Lamb

(57) ABSTRACT

A printhead is provided with a data receiver and a data driver, each of which is coupled to a common data pad. The printhead is also provided with a clock pad and a data bus. Means for shifting data between the data receiver and the data driver shifts data in accordance with strobe signals received over the clock pad. Additional means transfers data from the shifting means to the data bus, and yet further means transfers data from the data bus to the shifting means.

19 Claims, 5 Drawing Sheets

COMMON COMMUNICATION BUS AND PROTOCOL FOR MULTIPLE INJET PRINTHEADS IN A PRINTING SYSTEM

FIELD OF THE INVENTION

The invention pertains to reducing the number of interconnects between a printer control unit and the number of printheads which it controls.

BACKGROUND OF THE INVENTION

In the design of a printing system, and specifically, one using thermal inkjet printheads, special attention is given to the number of interconnects between the printer control unit and the number of printheads which it controls. Special attention is given to this element of the design due to a number of constraints. For example, interconnects between the printer control unit and its printheads must be able to flex repeatedly without breaking. Interconnects must also be within certain mass limits so as not to adversely impact printhead movement. Furthermore, the cost of the interconnects must remain low. One way to satisfy these constraints is to reduce the overall number of interconnects between the printer control unit and its printheads.

SUMMARY OF THE INVENTION

In the achievement of the foregoing, the inventor has devised a bidirectional, serial communication channel, and apparatus for implementing same, which can be used to connect an arbitrary number of inkjet printheads to the printer control unit of a printing system. One advantage of the communication channel is that it reduces the number of interconnects between the printer control unit and printheads as compared with previous designs. An advantage of the printheads which interface with the communication channel is that they respond quickly to data received over the communication channel, and do so with hardware which has a relatively low cost.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 1:
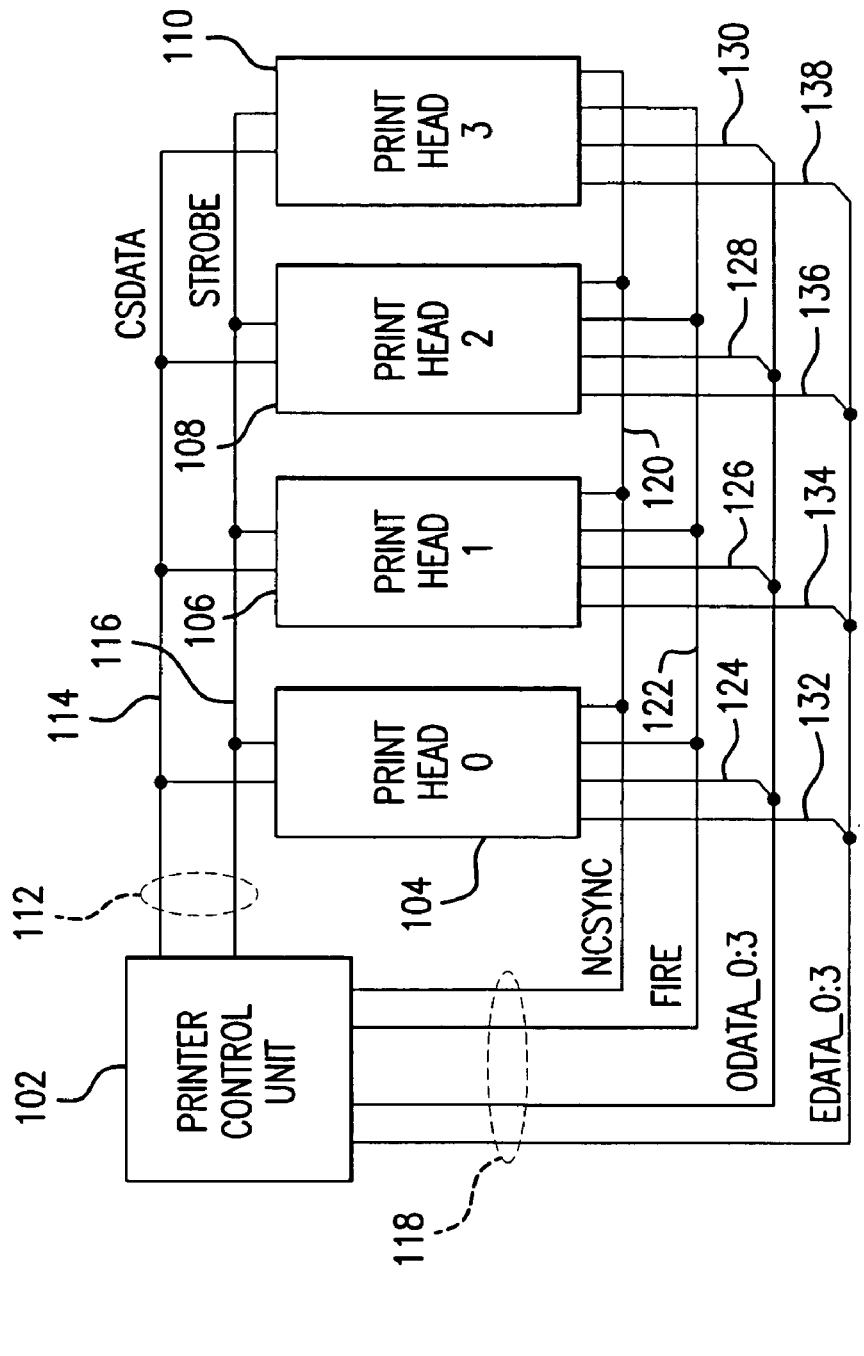
FIG. 1 illustrates a portion of a printing system comprising a printer control unit and a number of printheads.

A printing system 100 (FIG. 1) comprising a printer control unit 102 and a number of printheads 104–110 is illustrated in FIGS. 1–4. The printer control unit 102 and printheads 104–110 are interconnected by a clock wire 116 and a data wire 114. Each of the printheads 104–110 comprises a data receiver 212 (FIG. 2) and data driver 200 which can be coupled to the data wire 114, and a clock pad 244 which can be coupled to the clock wire 116. Internal to each printhead 104–110 is a data bus 384 (FIG. 3) and a shift register 300–330. The shift register comprises a plurality of storage elements 300–330 chained between the data receiver 212 and data driver 200 of a printhead. Each storage element 300–330 is coupled to a printhead's clock pad 244 so that data can be shifted from one storage element to the next in sync with clock pulses (or strobe signals) received at the clock pad 244. Outputs of a first number of the storage elements 300–314 are coupled to the printhead's data bus 384 so that a parallel unload of the storage elements 300–314 can be performed (i.e., data can be unloaded from the shift register 300–330, and loaded onto the data bus 384). A second number of the storage elements 316–330 comprise first and second data inputs (i.e., inputs A and B), of which the first data inputs form a part of the previously mentioned shift register 300–330, and the second data inputs are coupled to the previously mentioned data bus 384. It is conceivable in an alternative embodiment that one or more of the first 300–314 and second 316–330 numbers of storage elements could overlap. A select line 392 is coupled to each of the second number of storage elements 316–330 and serves to switchably couple either the first or the second data inputs of the second number of storage elements 316–330 to the outputs of the second number of storage elements 316–330. The second number of storage elements 316–330 therefore serve to load data in parallel into a printhead's shift register 300–330 (i.e., data can be loaded from a printhead's data bus 384 to a printhead's shift register 300–330).

The following method is used in a preferred embodiment to transmit data between the printer control unit 102 and number of printheads 104–110 of the above printing system 100. First, a strobe signal is transmitted over the clock wire 116 (by either the printer control unit 102 or some other device). Second, the printer control unit 102 transmits at least one start bit, at least one pen ID bit, and at least one data bit over the data wire 114. From the printhead side, each of the number of printheads 104–110 determines whether the at least one pen ID bit transmitted by the printer control unit 102 matches its own pen ID. If a printhead determines that a pen ID match exists, it retransmits the at least one pen ID it receives from the printer control unit 102. If a printhead determines that a pen ID match exists, and is aware that the printer control unit has initiated a write operation, it causes the at least one data bit which it receives from the printer control unit 102 to be written to an appropriate location. If a printhead determines that a pen ID match exists, and is aware that the printer control unit has initiated a read operation, it causes a number of data bits read from an appropriate location to be transmitted over the data wire 114.

The printing system 100 and method described in general above will now be described in greater detail.

A portion of a printing system comprising a printer control unit 102 and a number of printheads 104–110 is generally illustrated in FIG. 1. The printheads 104–110 are connected to the printer control unit 102 via two communication channels 112, 118.

The first communication channel 112 comprises a clock wire 116 (STROBE) and a data wire 114 (CSDATA). These wires 114, 116 are shared by the number of printheads 104–110, and connect the number of printheads 104–110 to the printer control unit 102.

The second communication channel 118 comprises a sync wire 120 (NCSYNC), a fire wire 122 (FIRE), and a plurality of additional data wires 124–138 (ODATA_0, EDATA_0, ODATA_1, EDATA_1, ODATA_2, EDATA_2, ODATA_3, EDATA_3). The sync 120 and fire 122 wires are shared by the number of printheads 104–110, and connect the number of printheads 104–110 to the printer control unit 102. Each printhead 104–110 is also connected to the printer control unit 102 via a dedicated pair of the additional data wires (e.g., printhead_0 is connected to the printer control unit via wires ODATA_0 and EDATA_0). Although the portion of a printing system 100 illustrated in FIG. 1 comprises four printheads 104–110, the number of printheads in any particular printing system 100 can vary from one to many, and four printheads 104–110 are illustrated in FIG. 1 by way of example only.

In one embodiment of a printer discussed in the following paragraphs, the printer comprises both the first 112 and second 118 communication channels discussed in the preceding paragraphs. In another embodiment of a printer, various wires forming a part of the second communication channel 118 are omitted.

One of ordinary skill in the art will realize that other communication channels and/or wires might also connect the number of printheads 104–110 to the printer control unit 102. One skilled in the art will also realize that the first 112 and second 118 communication channels need not be independent of one another.

1. Protocol

The first communication channel 112 is a bidirectional, serial communication channel which may be used to transmit information such as temperature data, status data, and other diagnostic data between the printer control unit 102 and the number of printheads 104–110. Communications over the first communication channel 112 are always initiated by the printer control unit 102, and in one sense, the printer control unit 102 is therefore the master of the first communication channel 112. Subsequent to the printer control unit's initiation of a communication over the first communication channel 112, one or more printheads respond to the printer control unit 102 via the same communication channel 112. A protocol with three distinct time periods is thereby established. The time periods are 1) Idle, 2) Printer Driving, and 3) Printhead Driving. (As will become clear in the following description, it is preferable that only one printhead respond to any given communication which is initiated by the printer control unit. However, instances arise where it would certainly be possible for a printer control unit to address more than one printhead simultaneously.)

During the Idle time period, the printer control unit 102 forces a logic "0" onto the data wire 114 of the first communication channel 112 (or otherwise allows the data wire 114 to assume a logic "0"), and all of the printheads 104–110 connected thereto remain in a listening mode.

During the Printer Driving time period, the printer control unit 102 transmits data to all of the printheads 104–110. The data comprises at least one start bit, followed by at least one read/write bit, at least one pen ID bit, at least one address bit, and at least one data bit. In a preferred embodiment, the at least one start bit comprises two start bits which are transmitted in immediate succession by forcing a logic "1" onto the data wire 114 during stobes of the clock wire 116. After detecting that the printer control unit 102 has transmitted a predetermined number of start bits, the printheads 104–110 begin reading the remaining data transmitted by the printer control unit 102, and watch for a pen ID which matches their own pen ID. If the pen ID transmitted by the printer control unit 102 matches a printhead's own pen ID, the printhead consumes and processes the remaining data transmitted by the printer control unit 102. In a preferred embodiment, immediately following its transmission of two start bits, the printer control unit 102 concludes the Printer Driving time period by transmitting the following bits, in the following order, over the data wire 114 of the first communication channel 112: a single read/write bit, two pen ID bits, four address bits, and eight data bits. Each of these bits will be discussed in detail later in this description.

During the Printhead Driving time period, a targeted printhead transmits data to the printer control unit 102. The data comprises at least one read/write bit, at least one pen ID bit, at least one address bit, and at least one data bit. The Printhead Driving time period follows the Printer Driving time period, and in a preferred embodiment, is separated from the Printer Driving time period by a single strobe of the clock wire 116. As briefly mentioned in the above paragraph, sometime during the Printer Driving time period, each printhead 104–110 will decode the start bits transmitted by the printer control unit 102 to determine if it is the target of the remainder of the data transmitted by the printer control unit 102. If a printhead determines that it is the target, it processes the remainder of the data transmitted by the printer control unit 102 accordingly, and if need be, transmits a response to the printer control unit 102. Printheads that determine they are not the target proceed to "block" (i.e., ignore incoming transmissions) during the targeted printhead's Printhead Driving time period (and possibly, the latter part of the preceding Printer Driving time period), and then return to a listening mode for the next Idle time period. The printer control unit 102 also returns to the Idle time period following the targeted printhead's Printhead Driving time period.

In a preferred embodiment, a targeted printhead's Printhead Driving time period provides for transmitting the following bits, in the following order, over the data wire 114 of the first communication channel 112: a single read/write bit, two pen ID bits, four address bits, and eight data bits. Thus, the format of the Printhead Driving time period mimics that of the Printer Driving time period.

If a communication between the printer control unit 102 and a printhead involves the printer control unit's transmission of a read bit, the data transmitted by a targeted printhead will comprise all of the same data transmitted to it by the printer control unit 102, but for a new selection of data bits which have been read from the register of the printhead which was addressed by the printer control unit 102 in its communication. If a communication between the printer control unit 102 and a printhead involves the printer control unit's transmission of a write bit, the data transmitted by a targeted printhead preferably comprises all of the same data transmitted to it by the printer control unit 102. In a preferred embodiment, a targeted printhead's failure to return the same data to the printer control unit 102 is interpreted by a printer system as an error.

The data portions of the above protocol are defined as follows:

1. One read/write bit: This bit is used to signal to a printhead that data should be read or written to an addressed register of the printhead.

2. Two pen ID bits: These bits are used to target a specific printhead connected to the first communication channel 112. The number of pen ID bits in a preferred embodiment depends on the number of printheads 104–110 being addressed over the first communication channel 112, but need not in an alternative embodiment. For example, a plurality of printheads could share a pen ID so that a printer control unit 102 could simultaneously write to all of the printheads with a common pen ID (note that reading from a plurality of printheads is not possible when the above described protocol is used in conjunction with a single data wire 114). In a preferred embodiment, two pen ID bits support four printheads 104–110.

3. Four address bits: These bits are used to address a particular register of a particular printhead (i.e., a register to be read, or a register to be written to). The number of address bits depends on the number and kind of registers to be addressed in a given kind of printhead.

4. Eight data bits: These bits convey particular information between the printer control unit 102 and targeted printheads. As with the number of address bits, the number of data bits can vary. During a read operation, a printer control unit 102 can transmit dummy data bits to a printhead. Likewise, during a write operation, a printhead can transmit dummy data bits to a printer control unit 102. However, as will be described below, it is preferred that a write operation conclude with a printhead's reading and retransmission of the data that it has written. In this manner, the printer control unit 102 can determine whether transmitted data has been written successfully.

2. Printhead Structure

As previously discussed, each of the number of printheads can receive data from, or send data to, the printer control unit 102 of the FIG. 1 printing system 100. To accomplish these data transmissions, each of the number of printheads 104–110 must comprise circuitry for interfacing with the first communication channel 112. A preferred embodiment of this circuitry is illustrated in FIGS. 2, 3 & 4.

Figure 2:
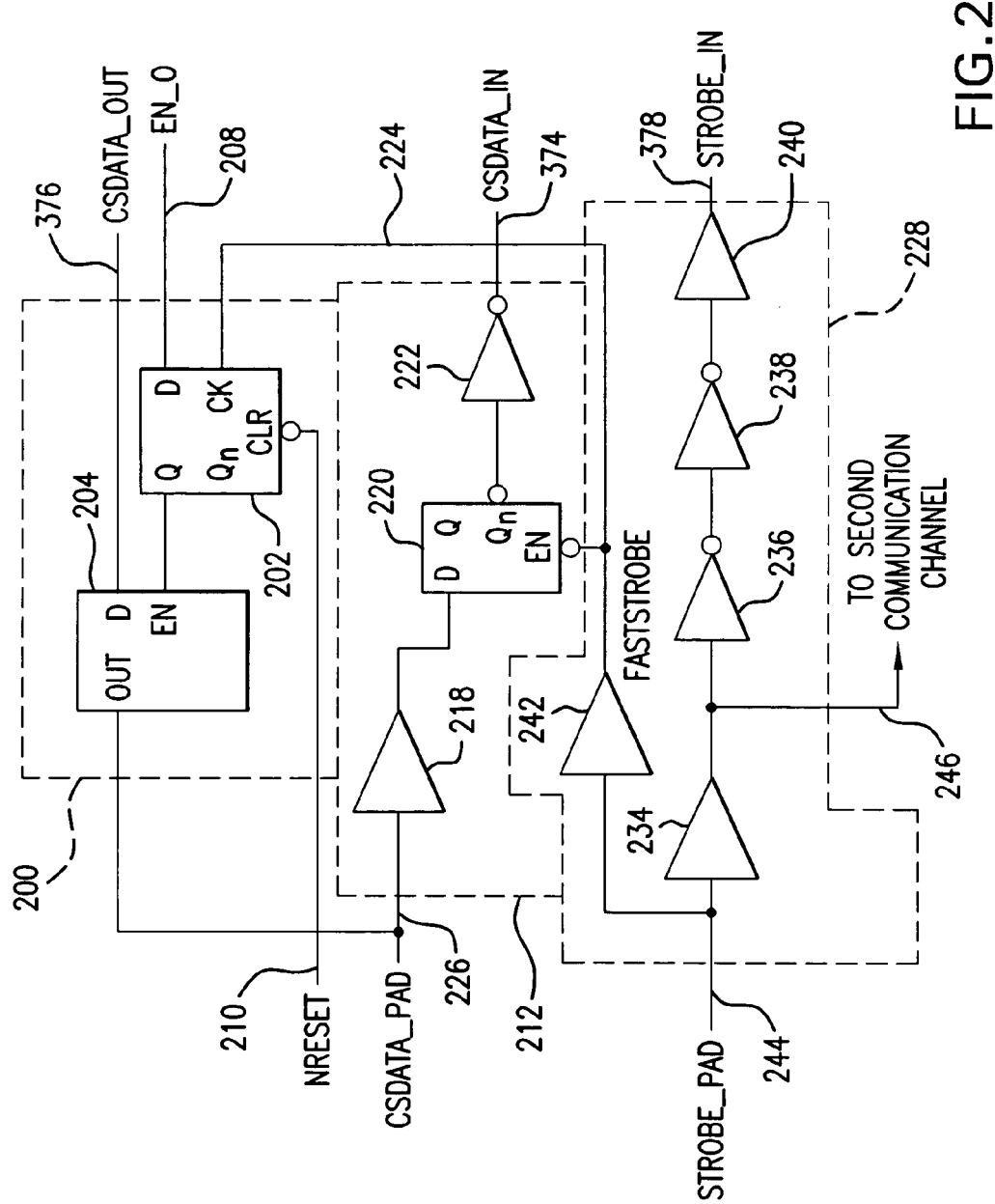
FIG. 2 illustrates the drivers and receivers used by one of the FIG. 1 printheads to interface with the FIG. 1 printer control unit.

In general, FIG. 2 illustrates a receiver circuit 228 comprising a clock pad, STROBE_PAD 244, for connection to the clock wire 116 of the first communication channel 112, and a driver/receiver circuit 200/212 comprising a data pad, CSDATA_PAD 226, for connection to the data wire 114 of the first communication channel 112. Pulses received by a printhead via STROBE_PAD 244 are conditioned to provide a STROBE_IN signal 378 and a FASTSTROBE signal 224. The STROBE_IN signal 378 is then routed to the circuitry of FIG. 3, while the FASTSTROBE signal 224 is routed to the driver/receiver circuitry 200/212 connected to CSDATA_PAD 226. Pulses of the FASTSTROBE signal 224 serve two purposes. First, during a printhead's receipt of data from the printer control unit 102, they assist in clocking data received by CSDATA_PAD 226 into the printhead as signals on line CSDATA_IN 374. Second, during a printhead's transmission of data to the printer control unit 102, they assist in clocking data out of the printhead via the CSDATA_PAD 226. FIG. 2 will be discussed in more detail later in this description.

Figure 3:
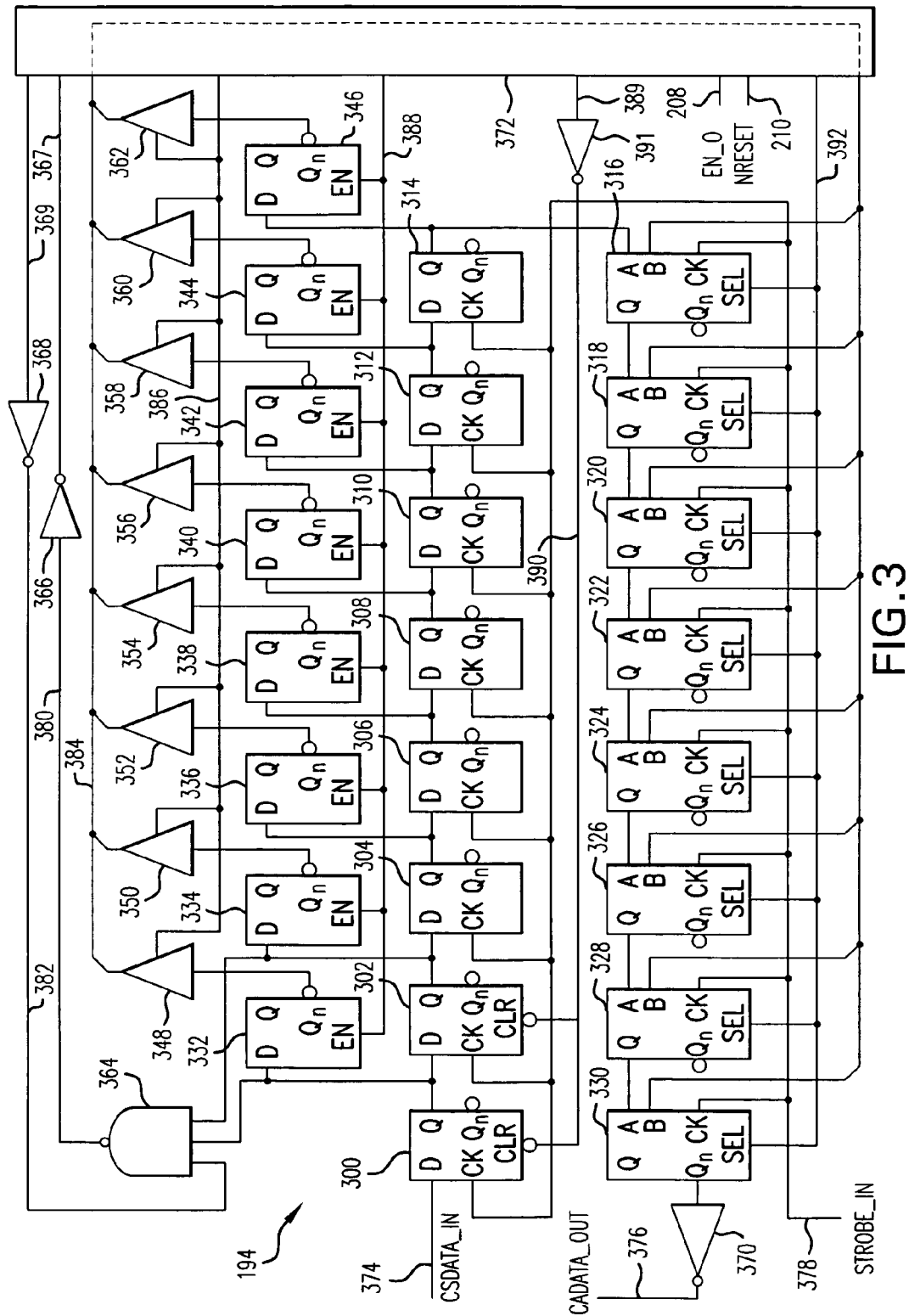
FIG. 3 illustrates a shift register and other components of a printhead which are used to process data received via the receivers illustrated in FIG. 2.

FIG. 3 generally illustrates a shift register comprising a plurality of storage elements 300–330 chained between the data receiver 212 and data driver 200 components of the CSDATA_PAD 226 driver/receiver circuitry 200/212. The plurality of storage elements 300–330 are coupled to one another so that data received by the printhead over the data wire 114 of the first communication channel 112 can be 1) shifted through the plurality of storage elements 300–330 and then 2) output to the data wire 114 for retransmission to the printer control unit 102. In addition to fulfilling the purposes of shifting and outputting data, some of the storage elements 300–314 serve to output received data to a data bus 384 which forms a part of the printhead, and some of the storage elements 316–330 serve to load data from the printhead's data bus 384 so that it too can be shifted and output to the data wire 114. FIG. 3 will also be discussed in more detail later in this description.

Figure 4:
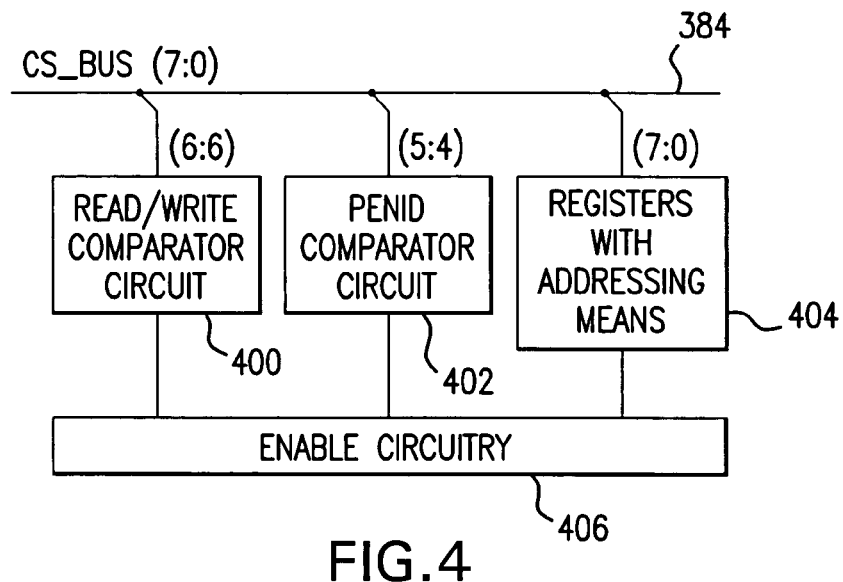
FIG. 4 illustrates comparator circuits, registers, and register addressing means which sample lines of a data bus illustrated in FIG. 3.

FIG. 4 illustrates various comparator circuits 400, 402 which receive data carried over the data bus 384 illustrated in FIG. 3. The comparator circuits 400, 402 are enabled by enable circuitry 406 (which is part of printhead control circuitry 372) as data relevant to each comparator circuit 400, 402 appears on the data bus 384. As will be understood by one of ordinary skill in the art, the enable circuitry 406 may comprise a number of functionally separate components that individually and/or selectively enable each of the comparator circuits 400, 402 at a point in time during which data pertinent to its compare operation appears on data bus 384. More specifically, the comparator circuits 400, 402 comprise a read/write comparator circuit 400 and a pen ID comparator circuit 402. The read/write comparator circuit 400 samples line 6 of data bus 384 when it is enabled, and the pen ID comparator circuit 402 samples lines 4 and 5 of data bus 384 when it is enabled. FIG. 4 also illustrates a number of registers and their addressing means 404, which sample up to all eight lines of data bus 384 when enabled by a printhead's control circuitry 372. The registers and their addressing means 404 may be implemented in various ways, such as a number of latches, a ROM (read only memory), a RAM (random access memory), a EEPROM (electrically erasable programmable read only memory) or other memory.

Returning now to FIG. 3, which illustrates a shift register comprising sixteen storage elements 300–330, one can see that the shift register comprises a primary input, CSDATA_IN 374, which provides data to a first of the number of storage elements 300, and a primary output, CSDATA_OUT 376, which provides data to the data driver 200 connected to CSDATA_PAD 210. Each of the first eight storage elements 300–314 (i.e., those chained to CSDATA_IN 374) is implemented as a D-Type flip-flop, and each of the second eight storage elements 316–330 (i.e., those chained to CSDATA_OUT 376) is implemented as an A/B multiplexor. The flip-flop 300 chained directly to CSDATA_IN 374 receives data from CSDATA_IN 374 at its D input, and each succeeding flip-flop in the first eight storage elements of the shift register 302–314 receives data from the Q output of the preceding flip-flop in the shift register 300–312. Thereafter, the Q output of each storage element in the shift register 314–328 is presented to the A input of the succeeding A/B multiplexor 316–330. The D-Type flip-flops 300–314 and A/B multiplexors 316–330 are therefore chained to one another in a master/slave relationship. The $Q_n$ output of the last multiplexor in the shift register 330 drives data to CSDATA_OUT 376 via an inverter 370. Data is clocked from one flip-flop to the next each time a clock pulse is imparted to STROBE_IN line 378.

In addition to shifting data, the first eight storage elements in the shift register 300–314 serve to output data received via CSDATA_IN 374 to data bus 384. Data is output to data bus 384 via a plurality of latches 332–346 and buffers 348–362, a pair of which (i.e., a latch and a buffer) respectively correspond to each of the first eight storage elements in the shift register 300–314 (e.g., storage element 300 corresponds to latch 332 and buffer 348). Each of the latches 332–346 is implemented as a transparent latch. The D input of each latch 332–346 is connected to the Q output of its corresponding storage element in the shift register 300–314, and the $Q_n$ output of each latch 332–346 is connected to the input of its corresponding buffer 348–362. The enable input of each latch 332–346 is connected to a latch line 388. Data bus 384 comprises eight lines, one corresponding to each of the first eight storage elements in the shift register 300–314. The output of each buffer 348–362 is connected to a different line of data bus 384. For purposes of this description, line 0 of data bus 384 is understood to be connected to the output of buffer 348, and line 7 of data bus 384 is understood to be connected to the output of buffer 362, with lines 1 through 6 of data bus 384 connected sequentially therebetween. The buffers 348–362 dump the data stored in latches 332–346 to data bus 384 when control circuitry 372 asserts the enable line 386.

The first two storage elements of the shift register 300, 302 also serve another purpose. That is, each of their outputs is presented to a start bit comparator 364. When the start bit comparator 364 is enabled via line 382, the start bit comparator 364 compares two bits which have been latched by the first and second storage elements of the shift register 300, 302 to determine whether they both are logic "1"s. If they are, the start bit comparator provides an indication of such to the printhead's control circuitry 372 over line 380. The start bit comparator 364 is implemented as a three-input NAND gate. Two of the inputs to the NAND gate 364 are derived from the Q outputs of the first and second storage elements in the shift register 300, 302, while the third input to the NAND gate 364 (the disable input) is derived from the printhead's control circuitry 372. The output of the NAND gate 364 is inverted by inverter 366, and is thereafter provided to the printhead's control circuitry 372 via start line 367 so as to notify the printhead that a start condition has been transmitted over the data wire 114 of the first communication channel 112. In response to receiving notification of a start condition's receipt, the control circuitry 372 pulls the input to inverter 368 high via disable line 369, thus disabling the start bit comparator 364. After a printhead has received a transmission from a printer control unit 102, and responded to same, the printhead's control circuitry 372 asserts a clear line 390 so as to clear any bits remaining in flip-flops 300 and 302. The control circuitry 372 also drives disable line 369 low, thus enabling start bit comparator 364 and placing the printhead in a listening mode.

In addition to shifting data, the second eight storage elements in the shift register 316–330 serve to load data carried over data bus 384 (i.e., a parallel load) so that it too can be shifted and output to the data wire 114 of the first communication channel 112. When shifting data, the select input, SEL, of each of the A/B multiplexors 316–330 receives a first logic value (e.g., a logic "1") over select line 392, and data is shifted from one multiplexor to the next via a chain of A inputs and Q outputs. However, when the printhead's control circuitry 372 drives a second logic value to select line 392 (e.g., a logic "0"), and a clock pulse is thereafter imparted to the STROBE_IN line 378, each of the A/B multiplexors 316–330 loads data carried over a different line of data bus 384. The data is loaded via the multiplexors' B inputs. Select line 392 therefore determines whether A/B multiplexors 316–330 operate in a serial shifting or parallel loading capacity.

As previously discussed, FIG. 2 illustrates a receiver circuit 228 comprising a clock pad (STROBE_PAD 244) for connection to the clock wire 116 of the first communication channel 112, and a driver/receiver circuit 200/212 comprising a data pad (CSDATA_PAD 226) for connection to the data wire 114 of the first communication channel 112. Clock pulses received by a printhead via the STROBE_PAD 244 are conditioned to provide a first series of clock pulses on FASTSTROBE line 224, and a second series of clock pulses on STROBE_IN line 378. The first series of clock pulses is produced by buffering the clock pulses received at STROBE_PAD 244 via buffer 242, and then routing the output 224 of the buffer 242 to the data driver/receiver circuit 200/212. In this manner, clock pulses received over the clock wire 116 of the first communication channel 112 are quickly provided to components of the data driver/receiver circuit 200/212 so that data may be clocked into or out of a printhead in sync with clock pulses received via STROBE_PAD 244.

The second series of clock pulses is produced by buffering the clock pulses received at STROBE_PAD 244 via buffers 234 and 240, and inverters 236 and 238. Clock pulses imparted to the STROBE_IN line 378 are therefore delayed with respect to clock pulses received at STROBE_PAD 244, and are also delayed with respect to clock pulses imparted to the FASTSTROBE line 224. In this manner, propagation delays in driving data from CSDATA_PAD 226 to the shift register 300–330 are taken into account when clocking the storage elements of the shift register 300–330. Note that clock pulses received over the clock wire 116 of the first communication channel 112 may be provided 246 to the second communication channel 118, to thereby clock data on a printhead's corresponding ODATA and EDATA lines into the printhead. One of ordinary skill in the art will therefore understand that the lines of the first and second communication channels 112, 118 need not be functionally independent.

The driver 200 and receiver 212 portions of the data driver/receiver circuit 200/212 illustrated in FIG. 2 will now be discussed in further detail. When data is received at the data pad 226 of a printhead, it is buffered via buffer 218, and presented to the D input of a transparent latch 220. Buffer 218 should impart a delay to the data which is less than the delay imparted to the clock pulses received by buffer 242. The D input of transparent latch 220 can therefore stabilize prior to the enablement of transparent latch 220 via a clock pulse imparted to the FASTSTROBE line 224. When enabled, transparent latch 220 transfers its data to CSDATA_IN 374 via its $Q_n$ output and inverter 222. Data is thereafter processed by the circuitry of FIG. 3 before being output from the FIG. 3 circuitry on CSDATA_OUT 376.

CSDATA_OUT 376 is provided to the D input of a transparent latch 204. Latch 204 is cascaded from a D-type flip-flop 202 such that the Q output of flip-flop 202 drives the enable input of latch 204. Flip-flop 202 receives an enable signal 208 from the control-circuitry 372 of a printhead at its D input, and receives clock pulses from the FASTSTROBE line 224. Latch 202 is therefore enabled 1) in a clocked manner, and 2) only when the enable signal EN_O 208 is asserted. By enabling latch 204 in a clocked manner, any skew in the data which is to be output on CSDATA_PAD 226 is mitigated. By enabling flip-flop 202, and thus latch 204, via a signal generated by a printhead's control circuitry 372, a printhead can control whether all or only some of the data shifted out of its shift register 300–330 is output to CSDATA_PAD 226.

3. Operation

The circuitry disclosed in FIGS. 1–4 operates as follows. During the Idle time period of the previously disclosed protocol, line 382 is asserted via a printhead's control circuitry 372. This places start bit comparator 364 in a listening mode.

Sometime prior to the printer control unit's first transmission of data, each printhead 104–110 connected to the first communication channel 112 must be assigned a pen ID. One skilled in the art will realize that there are a multitude of ways in which printheads 104–110 may be assigned a pen ID. For example, a printhead of a given color and/or type can be preprogrammed during fabrication with a pen ID which is indicative of the given color and/or type. The preprogrammed pen ID can be stored in a EEPROM, RAM, ROM or other suitable memory device. However, pen IDs can also be assigned dynamically.

In the printing system 100 illustrated in FIG. 1, each of the number of printheads 104–110 is assigned a pen ID via the second communication channel 118. As will become clear from the following discussion, pen IDs are assigned dynamically, and are assigned at times which are determined by the printer control unit 102.

Figure 5:
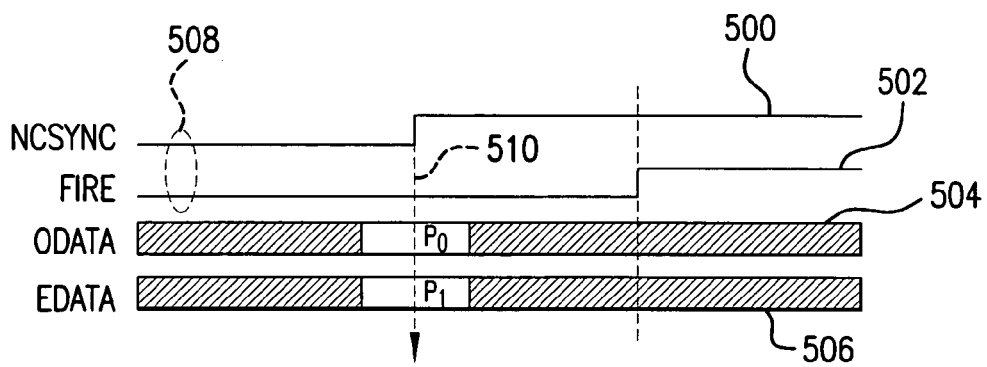
FIG. 5 is a timing diagram illustrating the latching of a pen ID into one of the FIG. 1 printheads.

The printer control unit 102 programs the pen ID register of a printhead 104 as follows. First, the NCSYNC 120 and FIRE 122 lines of the second communication channel 118 are brought low 508 (FIG. 5), thereby triggereing a global pen reset (i.e., a reset of all of the printheads 104–110). In a preferred embodiment, a global pen reset 508 requires that the NCSYNC 120 and FIRE 122 lines remain low for at least 200 ns. While the NCSYNC 120 and FIRE 122 lines remain at a logic low, pen ID bits ($P_0$ and $P_1$) are driven onto the ODATA 124 and EDATA 132 lines associated with a printhead 104. The printer control unit 102 then drives the NCSYNC line 120 high 510 to latch the pen ID bits into the printhead 104. Since the NCSYNC 120 and FIRE 122 lines of the second communication channel 118 are shared by the printer control unit 102 and all of the printheads 104–110, the printer control unit 102 can simultaneously latch a pen ID into each of the number of printheads 104–110.

Typically, each printhead 104–110 will be assigned a unique pen ID so that the printer control unit 102 can individually address each of the printheads 104–110 over the first communication channel 112. However, in a given printer arrangement, it might be desirable to assign two or more printheads a common pen ID. In this manner, the printer control unit 102 can simultaneously write to each of the two or more printheads sharing the common pen ID. Note that when multiple ones of the FIG. 1 printheads 104–110 are assigned a common pen ID, it is not possible for the printer control unit 102 to perform either a read operation or a data write verification over the first communication channel 112, as doing so would result in a data collision on the data wire 114 as more than one printhead tried to transmit data over the data wire 114. A data write verification will be described later in this description.

Note that the second communication channel 118 is typically utilized for sending print data to the printheads 104–110 (i.e., for controlling the nozzles of the printheads 104–110 during their dispensing of ink). Under normal operation, the ODATA 124–130 and EDATA 132–138 lines therefore supply data to the printheads 104–110, and the FIRE line 122 latches data on the ODATA 124–130 and EDATA 132–138 lines into the printheads 104–110. Note that a global pen reset causes printhead control circuitry 372 to assert clear line 389, thus driving the Q outputs of flip-flops 300 and 302 to a low state, to thereby ensure that start bit comparator 364 does not inadvertently indicate to a printhead that a start condition has been received. A global pen reset also causes NRESET 210 to be asserted. The assertion of NRESET 210 can be used for a variety of reset tasks, including the reset of a printhead's data driver 202.

Figure 6:
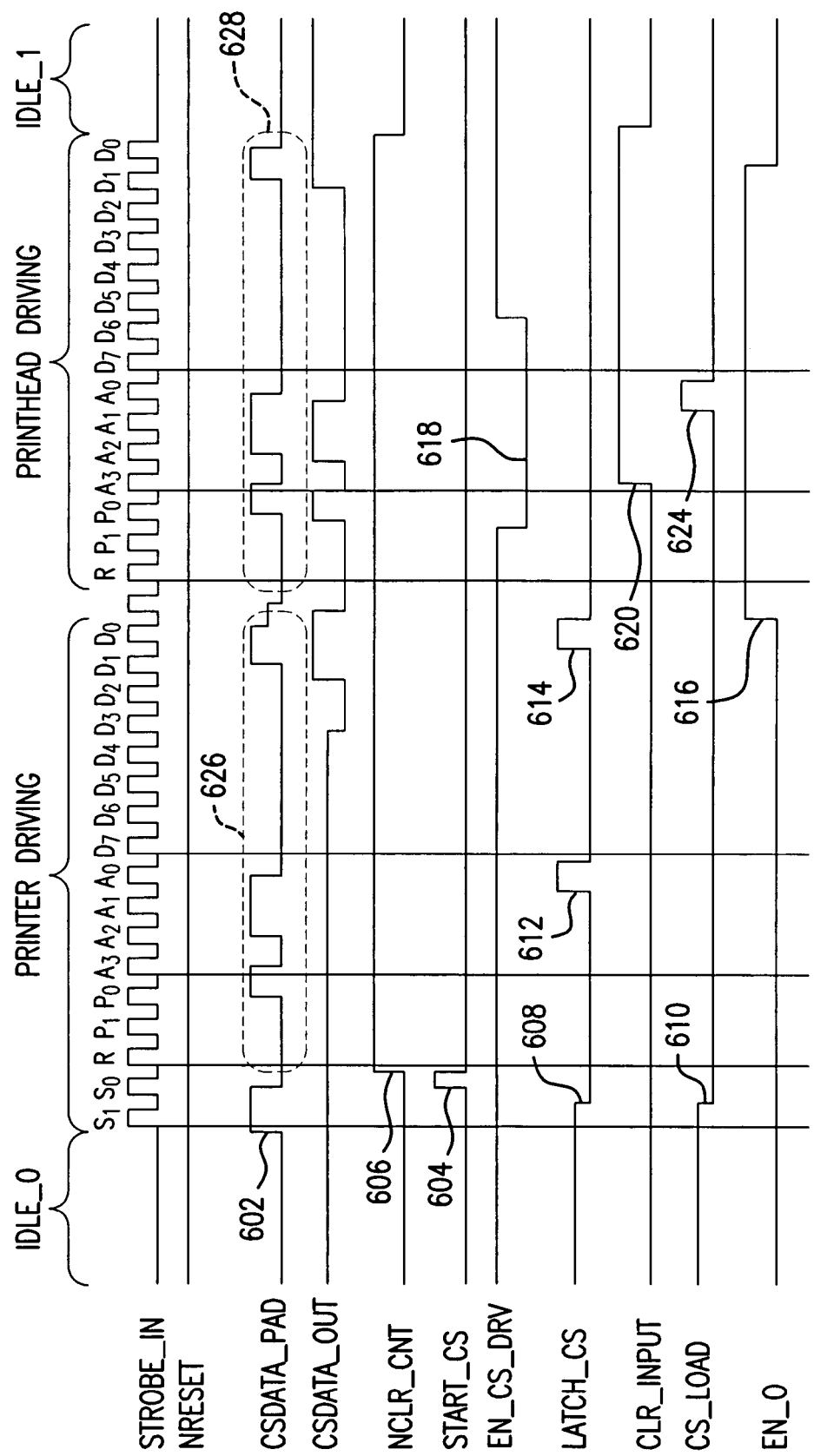
FIG. 6 is a timing diagram illustrating the states of various printhead signal lines during the execution of a write operation which is initiated by the FIG. 1 printer control unit.

The operation of the printhead circuitry illustrated in FIGS. 2–4 will be explained in conjunction with the timing diagram of an exemplary write operation illustrated in FIG. 6. Note that the STROBE_IN waveform illustrated in FIG. 6 appears on line 378 (FIG. 3), the NRESET waveform appears on line 206, the CSDATA_PAD waveform appears on line 226, the CSDATA_OUT waveform appears on line 376, the NCLR_CNT waveform appears on line 369, the START_CS waveform appears on line 367, the EN_CS_DRV waveform appears on line 386, the LATCH_CS waveform appears on line 388, the CLR_INPUT waveform appears on line 389, the CS_LOAD waveform appears on line 392, and the EN_O waveform appears on line 208.

After a pen ID has been assigned to one or more printheads 104–110, the printer control unit 102 can initiate communications with the one or more printheads 104–110 (that is, communications over the first communication channel 112). Prior to the printer control unit's initiation of a communication, the printer control unit 102 and the printheads 104–110 to which it is connected are in the Idle time period of the above protocol, and all of the printheads 104–110 are in a listening mode.

The Printer Driving time period of the above protocol begins with the printer control unit's transmission of two start bits 602 (FIG. 6) over data wire 114. Each of the start bits comprises an assertion of the data wire 114 (i.e., a logic high or logic "1") during the rising edge of a clock wire pulse (e.g., $S_1$ and $S_2$ of STROBE_IN 378). The two start bits 602 are transmitted in succession (i.e., during clock wire pulses $S_1$ and $S_2$), and together, define a start condition. While a start condition can comprise any number of start bits, it is noted that a printhead might have difficulty in distinguishing a single start bit from "soft errors" which might occur on the data and clock wires 112, 114. At the same time, the transmission of more than two bits seems to be more than is necessary to distinguish start bits from most soft errors, and creates unnecessary delay.

When start bits are received by a printhead, they are clocked through the data receiver portion 212 of the printhead, and then ultimately clocked into flip-flops 300 and 302. As flip-flops 300 and 302 receive the start bits, their Q outputs are driven high, thus providing start bit comparator 364 with the additional two logic values it needs to pull down line 380. When line 380 is pulled low, inverter 366 pulls start line 367 high, and printhead control circuitry 372 acknowledges that a start condition has been received by asserting disable line 369. When disable line 369 goes high, inverter 368 pulls line 382 low to thereby disable start bit comparator 364. The waveform appearing on start line 367 is illustrated in FIG. 6 as waveform START_CS, with the assertion of same which is triggered by start bit comparator 364 appearing at 604. The waveform appearing on disable line 369 is illustrated in FIG. 6 as waveform NCLR_CNT, with the assertion of same which is triggered by the assertion of line 367 appearing at 606. After receipt of a start condition, printhead control circuitry 372 ensures that start bit comparator 364 remains disabled for the remainder of a given Printer Driving time period, as well as the subsequent Printhead Driving time period.

A printhead's receipt of a start condition also causes printhead control circuitry 372 to pull latch line 388 and select line 392 low. In this manner, the parallel loading and unloading features associated with a printhead's shift register 300–330 are temporarily disabled. The waveform appearing on latch line 388 is illustrated in FIG. 6 as waveform LATCH_CS, with the low level of same which is triggered by a printhead's receipt of a start condition appearing at 608. The waveform appearing on select line 392 is illustrated in FIG. 6 as waveform CS_LOAD, with the low level of same which is triggered by a printhead's receipt of a start condition appearing at 610.

Immediately after its transmission of start bits, the printer control unit transmits two start bits, a single read/write bit, two pen ID bits, four address bits, and eight data bits. A printhead which has detected the printer control unit's transmission of a start condition will proceed to shift the read/write bit, pen ID bits, and address bits into its shift register 300–330. Following its receipt of the address bits, a printhead will trigger a first parallel unload of the contents of storage elements 300–314. The first parallel unload is triggered by the printhead control circuitry's assertion of latch line 388. The waveform appearing on latch line 388 is illustrated in FIG. 6 as waveform LATCH_CS, with the assertion of same which is triggered by a printhead's receipt of nine bits (including start bits) appearing at 612. When latch line 388 is asserted, the address bits stored in storage elements 300–306 are latched into latches 332–338, the pen ID bits stored in storage elements 308 and 310 are latched into latches 340 and 342, the read/write bit stored in storage element 312 is latched into latch 344, and a start bit stored in storage element 314 is latched into latch 346. After the preceding bits are latched into latches 332–346, they may be further unloaded to data bus 384 via buffers 348–362. Buffers 348–362 are enabled via the assertion of enable line 386, and are only enabled when data bus 384 is not otherwise in use. In a preferred arrangement, buffers 348–362 are enabled throughout the Printer Driving time period, and data which is unloaded from storage elements 300–314 is immediately driven onto data bus 384. The waveform appearing on enable line 386 is illustrated in FIG. 6 as waveform EN_CS_DRV.

As illustrated in FIG. 4, lines 4 and 5 of data bus 384 can be sampled by pen ID comparator circuit 402 when pen ID comparator circuit 402 is enabled by printhead control circuitry 372. Lines 4 and 5 of data bus 384 are respectively connected to buffers 356 and 358. Printhead control circuitry 372 enables pen ID comparator circuit 402 at a time when pen ID are present on data bus 384. In this manner, the pen ID comparator circuit 402 can compare the pen ID bits appearing on data bus 384 with the pen ID of the printhead of which it is a part. A detailed description of pen ID comparator circuit 402 is not provided in this description, as the construction and use of a particular comparator circuit is well within the capability of one skilled in the art.

Read/write comparator circuit 400 and addressing means 404 can be enabled at the same time as pen ID comparator circuit 402, or alternatively, can be enabled upon the pen ID comparator circuit's indication of a pen ID match. Regardless, the function of read/write comparator circuit 400 is to sample line 6 of data bus 384 and determine whether the printer control unit 102 wishes to initiate a read or a write operation. Line 6 of data bus 384 is connected to buffer 360. The function of addressing means 404 is to sample lines 0 thorugh 3 of data bus 384 (i.e., lines which are respectively connected to buffers 348–354). The address carried on these lines determines which register of a printhead will be read from or written to.

Note that the start bit unloaded from storage element 314 can be ignored.

Although the above paragraphs have described a first parallel unload of the data stored in storage elements 300–314, note that the data which unloaded is a copy of the data stored in storage elements 300–314, and that after the first parallel unload is completed, storage elements 300–314 continue to store a start bit, a read/write bit, pen ID bits, and address bits.

For the sake of better understanding, it will be assumed that the pen ID comparator circuit 402 of a printhead indicated a pen ID match, and that the read/write comparator circuit 400 of the same printhead indicated a printer control unit's initiation of a write operation.

During or after the operation of pen ID comparator circuit 402, read/write comparator circuit 400, and addressing means 404, a printhead's shift register 300–330 will continue to shift data received from the printer control unit until eventually, each of storage elements 300–314 comprise a data bit, each of storage elements 316–322 comprise an address bit, each of storage elements 324 and 326 comprise a pen ID bit, storage element 328 comprises a read/write bit, and storage element 330 comprises a start bit. At or before this point in time, latch line 388 is enabled to thereby trigger a second parallel unload. During this second parallel unload, the data bits stored in storage elements 300–314 are unloaded to data bus 384. If the printer control unit 102 has initiated a write operation, the data bits are written to the printhead register which was previously addressed by the addressing means 404. If the printer control unit 102 has initiated a read operation, the data bits are ignored. In fact, in the case of a read operation, it is possible for the printer control unit 102 to transmit "dummy data" (i.e., data which has no practical use). The second parallel unload is triggered by an assertion of LATCH_CS at 614 (FIG. 6).

When the printer control unit has completed a transmission, the Printer Driving time period comes to an end, and the Printhead Driving time period commences. Between the Printer Driving and Printhead Driving time periods, a single clock wire pulse serves to clock the start bit out of the final storage element 330 of a printhead's shift register. This start bit, as well as all of the other bits clocked out of a printhead's shift register 300–330 during a Printer Driving time period, are discarded by disabling data driver 200. Printhead control circuitry 372 disables the data driver 200 by driving line EN_O 208 low, as previously described. After the final start bit has been discarded from a printhead's shift register 300–330, printhead control circuitry 372 drives EN_O 208 high, and enables data driver 200 for the subsequent shifting and outputting of the read/write bit, pen ID bits, and address bits which were previously received by the storage elements 300–330 of a printhead's shift register. Thus, the read/write bit, pen ID bits, and address bits transmitted by a printhead are merely a shifted version of the same bits transmitted by the printer control unit 102. A printhead's output of these bits can be used as a confirmation to the printer control unit 102 that the printhead's shift register 300–330 is in proper working order. The waveform appearing on line EN_O 208 is illustrated in FIG. 6 as waveform EN_0, with the assertion of same which enables the propagation of CSDATA_OUT 376 to CSDATA_PAD 226 appearing at 616.

Subsequent to shifting the last of four address bits out of a printhead's shift register 300–330, a parallel load into storage elements 316–330 is performed. If the printer control unit 102 initiated a read operation, data read from a printhead register 404 will have been placed on the lines of data bus 384 prior to the parallel load. When the printhead control circuitry 372 asserts select line 392, A/B multiplexors 316–330 upload the data on bus 384 via their B inputs. The printhead control circuitry 372 then deactivates select line 392, thereby allowing storage elements 316–330 to shift the data read from an appropriate printhead register 404 to CSDATA_OUT 376 (and subsequently, to SCDATA_PAD 226). If the printer control unit 102 initiated a write operation, the parallel load may be skipped, and further data shifted out of a printhead may be ignored by the printer control unit. However, in a preferred printhead embodiment, the Printhead Driving time period concludes with a data write verification. The waveform appearing on select line 392 is illustrated in FIG. 6 as waveform CS_LOAD, with the assertion of same which triggers the parallel load of data into storage elements 316–330 appearing at 624. To prevent inadvertent unloading of storage elements 300–314 onto data bus 384 at the same time data bus 384 is being used to load data into storage elements 316–330, printhead control circuitry 372 pulls enable line 386 low so as to isolate storage elements 300–314 and latches 332–346 from bus 384. The waveform appearing on enable line 386 is illustrated in FIG. 6 as waveform EN_CS_DRV, with the low portion of same which prevents the inadvertent occurrence of a parallel unload appearing at 618.

A data write verification comprises reading the data which was written to a printhead register 404 as a result of the current communication over the first communication channel 112. Data is read as in a normal read operation and placed on data bus 384. When the printhead control circuitry 372 asserts select line 392, A/B multiplexors 316–330 upload the data on bus 384 via their B inputs. The printhead control circuitry 372 then deactivates select line 392, thereby allowing storage elements 316–330 to shift the data read from an appropriate printhead register 404 to CSDATA_OUT 376 (and subsequently, to SCDATA_PAD 226). However, note that the above procedure, without more, does not verify that a printhead's internal registers and addressing means 404 are operating appropriately. This is because data loaded onto bus 384 via buffers 348–362 remains on bus 384 absent a use of bus 384 which intervenes between a parallel unload and parallel load of shift register 300–330. In other words, registers and addressing means 404 could fail to retrieve data from bus 384, and such a failure would not be detected. To ensure that the operation of all pertinent components within a printhead is verified, data unloaded from storage elements 300–314 is driven to data bus 384 in inverted form. This is done by connecting the inputs of buffers 348–362 to the $Q_n$ outputs (i.e., the inverted outputs) of latches 332–346. The comparator circuits 400, 402, registers and addressing means 404 of FIG. 4 are therefore adapted to account for this inversion. If a printhead's registers and/or addressing means 404 fails, data loaded into storage elements 316–330 during a parallel load of the printhead's shift register 300–330 will either be erroneous, or in inverted form. Such erroneous or inverted data may then be detected by the printer control unit 102, and appropriate corrective action may be taken.

Note that in the case of a write operation, the data 628 (FIG. 6) transmitted over the first communication channel 112 by a printhead mirrors the data 626 transmitted over the first communication channel 112 by the printer control unit 102.

At the close of a Printhead Driving time period, the first communication channel 112 again enters an Idle time period. Prior to the commencement of this new Idle time period (or as soon after its commencement as possible), printhead control circuitry 372 asserts clear line 389 so as to clear any data bits which might have been clocked into storage elements 300 and 302. Printhead control circuitry 372 also pulls down disable line 369 so as to once again enable start bit comparator 364. In this manner, a printhead re-enters its listening mode.

4. Alternative Embodiments

Since printer control unit 102 initiates all communications over the first communication channel 112, it is preferred that the printer control unit 102 produce the pulses on clock Wire 116 (i.e., the STROBE line). However, it is within the scope of this invention to have a clock source which is structurally and/or functionally distinct from the printer control unit 102. It is also within the scope of this invention to provide a clock source which produces either continuous or discontinuous pulses on the clock wire 116. If the pulses produced by the clock source are continuous, the printer control unit 102 must synchronize its data transmissions with the pulse train. If the pulses produced by the clock source are discontinuous, the printer control unit 102 must start and/or initiate the production of clock pulses prior to its transmission of a start condition. Such modifications to the clock source are believed to be well within the skill of one skilled in the art.

Although the above description has presumed that the clock 116 and data 114 wires of the first communication channel 112 are biased (or driven) to a logic "0" during the Idle time period, the opposite convention can just as easily be adopted.

Although printheads 104–110 in a typical inkjet printing system will comprise a plurality of status registers, all of which will need to be read and written over the first communication channel 112, it is conceivable that the basic protocol disclosed herein might be used with 1) printheads comprising a single status register, and/or 2) printheads comprising one or more registers which are always written to, or always read. In the former case, the transmission of address bits could be eliminated from the protocol. In the latter case, the read/write bit could be eliminated from the protocol.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A printhead, comprising:
   a) a data receiver and a data driver, said data receiver and data driver being coupled to a common data pad;
   b) a clock pad;
   c) a data bus;
   d) a shift register comprising a plurality of storage elements chained between said data receiver and said data driver, wherein:
      i) at least one of said storage elements is coupled to said clock pad;
      ii) outputs of a first number of said storage elements are coupled to said data bus; and
      iii) a second number of said storage elements comprise first and second data inputs, of which said first data inputs form a part of said shift register, and said second data inputs are coupled to said data bus; and
   e) a select line coupled to said second number of storage elements for switchably coupling either of said first or said second data inputs of said second number of storage elements to outputs of said second number of storage elements.

2. A printhead as in claim 1, further comprising
   a) a start line;
   b) a disable line; and
   c) a start bit comparator, said start bit comparator comprising:

i) at least one input coupled to an output of at least one of said plurality of storage elements;
ii) an output coupled to said start line; and
iii) a disable input for carrying a signal which is determined in part by the state of said start line.

3. A printhead as in claim 2, further comprising a clear line coupled to those of said plurality of storage elements having outputs coupled to said start bit comparator.

4. A printhead as in claim 3, further comprising:
a) a latch line; and
b) a plurality of latches coupled to said latch line;
wherein said outputs of said first number of storage elements are coupled to inputs of said latches, and outputs of said latches are coupled to said data bus.

5. A printhead as in claim 4, further comprising:
a) an enable line; and
b) a plurality of buffers coupled to said enable line;
wherein said outputs of said latches are coupled to inputs of said buffers, and outputs of said buffers are coupled to said data bus.

6. A printhead as in claim 4, further comprising a data driver enable circuit coupled between an output of said shift register and said data driver.

7. A printhead as in claim 6, further comprising:
a) a read/write comparator circuit;
b) a pen ID comparator circuit; and
c) control circuitry for:
i) placing said printhead in a listening mode by enabling said start bit comparator via said disable line;
ii) disabling said start bit comparator via said disable line, for a period of time after said start line is asserted;
iii) causing at least one read/write bit, at least one pen ID bit, and at least one address bit received by said first number of storage elements to be output to said data bus by asserting said latch line;
iv) if said at least one pen ID bit matches a pen ID of said printhead, and said at least one read/write bit is indicative of a write operation, causing at least one data bit received by said first number of storage elements to be output to said data bus and written to a location determined by said at least one address bit;
v) if said at least one pen ID bit matches a pen ID of said printhead, and said at least one read/write bit is indicative of a read operation, causing a number of data bits addressed by said at least one address bit to be placed on said data bus, and causing said select line to be asserted; and
vi) before a read or write operation is completed, causing said at least one read/write bit, said at least one pen ID bit, and said at least one address bit to be output from said printhead via said data driver.

8. A printhead as in claim 7, wherein if said at least one pen ID bit matches a pen ID of said printhead, and said at least one read/write bit is indicative of a write operation, said control circuitry causes said at least one data bit which was written to a location determined by said at least one address bit to be read from said location and placed on said data bus, and thereafter causes said select line to be asserted.

9. A printhead as in claim 6, further comprising:
a) a pen ID comparator circuit; and
c) control circuitry for:
i) placing said printhead in a listening mode by enabling said start bit comparator via said disable line;
ii) disabling said start bit comparator via said disable line, for a period of time after said start line is asserted;
iii) causing at least one pen ID bit received by said first number of storage elements to be output to said data bus by asserting said latch line;
iv) if said at least one pen ID bit matches a pen ID of said printhead, and said printhead is conducting a write operation, causing at least one data bit received by said first number of storage elements to be output to said data bus and written to a register within said printhead;
v) if said at least one pen ID bit matches a pen ID of said printhead, and said printhead is conducting a read operation, causing a number of data bits to be placed on said data bus, and causing said select line to be asserted; and
vi) before a read or write operation is completed, causing said at least one pen ID bit to be output from said printhead via said data driver.

10. A printhead as in claim 1, further comprising a data driver enable circuit coupled between an output of said shift register and said data driver.

11. A printhead as in claim 1, further comprising:
a) a latch line; and
b) a plurality of latches coupled to said latch line;
wherein said outputs of said first number of storage elements are coupled to inputs of said latches, and outputs of said latches are coupled to said data bus.

12. A printhead as in claim 11, further comprising:
a) an enable line; and
b) a plurality of buffers coupled to said enable line;
wherein said outputs of said latches are coupled to inputs of said buffers, and outputs of said buffers are coupled to said data bus.

13. A printhead, comprising:
a) a data receiver and a data driver, said data receiver and data driver being coupled to a common data pad;
b) a clock pad;
c) a data bus;
d) means for shifting data between said data receiver and said data driver in accordance with strobe signals received over said clock pad;
e) means for transferring data from said means for shifting to said data bus; and
f) means for transferring data from said data bus to said means for shifting.

14. A printhead as in claim 13, wherein:
a) said means for shifting data is a means for shifting serial data; and
b) said means for transferring data from said data bus to said means for shifting is a parallel data transfer means.

15. A printhead as in claim 13, wherein:
a) said means for shifting data is a means for shifting serial data; and
b) said means for transferring data from said means for shifting to said data bus is a parallel data transfer means.

16. Apparatus for printing, comprising:
a) a printer control unit;
b) a number of printheads;
c) a clock wire interconnecting the printer control unit and the number of printheads; and
d) a data wire interconnecting the printer control unit and the number of printheads;

e) wherein each of the number of printheads comprises:
   i) a data receiver and a data driver, said data receiver and data driver being coupled to said data wire;
   ii) a clock pad coupled to said clock wire;
   iii) a data bus;
   iv) shift register comprising a plurality of storage elements chained between said data receiver and said data driver, wherein:
      A) each of said storage elements is coupled to said clock pad;
      B) outputs of a first number of said storage elements are coupled to said data bus; and
      C) a second number of said storage elements comprise first and second data inputs, of which said first data inputs form a part of said shift register, and said second data inputs are coupled to said data bus; and
   v) a select line coupled to said second number of storage elements for switchably coupling either of said first or said second data inputs of said second number of storage elements to outputs of said second number of storage elements.

17. A method of transmitting data between a printer control unit and a number of printheads, wherein said printer control unit and number of printheads are interconnected via a clock wire and a data wire, comprising the steps of:
   a) transmitting a strobe signal over said clock wire;
   b) said printer control unit transmitting at least one start bit, at least one read/write bit, at least one pen ID bit, at least one address bit, and at least one data bit over said data wire; and
   c) each of said number of printheads,
      i) determining whether said at least one pen ID bit matches a pen ID of the printhead;
      ii) if said at least one pen ID bit matches the pen ID of the printhead, retransmitting said at least one read/write bit, said at least one pen ID bit, and said at least one address bit over said data wire;
      iii) if said at least one pen ID bit matches the pen ID of the printhead, and said at least one read/write bit is indicative of a write operation, causing said at least one data bit to be written to a location which is determined by said at least one address bit; and
      iv) if said at least one pen ID bit matches the pen ID of the printhead, and said at least one read/write bit is indicative of a read operation, causing a number of data bits addressed by said at least one address bit to be transmitted over said data wire.

18. A method of accepting data transmitted by a printer control unit by a printhead assigned a pen ID and coupled to the printer control unit via a clock wire and a data wire, comprising the steps of:
   accepting a strobe signed over the clock wire
   accepting at least one start bit, at least one read/write bit, at least one pen ID bit, at least one address bit, and at least one data bit over the data wire;
   determining whether said at least one pen ID bit matches a pen ID of the printhead;
   when said accepted at least one pen ID bit matches the pen ID of the printhead, retransmitting said accepted at least one read/write bit, said accepted at least one pen ID bit, and said accepted at least one address bit over said data wire; and
   when said accepted at least one pen ID bit matches the pen ID of the printhead, and said accepted at least one read/write bit is indicative of a write operation, causing said accepted at least one data bit to be written to a printhead location which is determined by said accepted at least one address bit.

19. A method of accepting data transmitted by a printer control unit by a printhead assigned a pen ID and coupled to the printer control unit via a clock wire and a data wire, comprising the steps of:
   accepting a strobe signal over the clock wire;
   accepting at least one start bit, at least one read/write bit, at least one pen ID bit, at least one address bit, and at least one data bit over the data wire;
   determining whether said at least one pen ID bit matches a pen ID of the printhead;
   when said accepted at least one pen ID bit matches the pen ID of the printhead, retransmitting said accepted at least one read/write bit, said accepted at least one pen ID bit, and said accepted at least one address bit over said data wire; and
   when said accepted at least one pen ID bit matches the pen ID of the printhead, and said accepted at least one read/write bit is indicative of a read operation, causing a number of data bits addressed by said at least one address bit to be transmitted over said data wire.

* * * * *

UNITED STATES PATENT AND TRADEMARK OFFICE
CERTIFICATE OF CORRECTION

PATENT NO. : 7,019,866 B1
APPLICATION NO. : 09/386034
DATED : March 28, 2006
INVENTOR(S) : Jeffery S Beck et al.

It is certified that error appears in the above-identified patent and that said Letters Patent is hereby corrected as shown below:

On the Title page, in field (54), in column 1, in "Title", line 2, delete "INJET" and insert -- INKJET --, therefor.

In column 1, line 2, delete "INJET" and insert -- INKJET --, therefor.

In column 17, line 6, in Claim 16, insert -- a -- before "shift".

Signed and Sealed this

Twenty-sixth Day of May, 2009

JOHN DOLL
*Acting Director of the United States Patent and Trademark Office*